Patented Feb. 2, 1932

1,843,869

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

GLYCERIDE RESIN AND PROCESS OF PRODUCING SAME

No Drawing.  Application filed April 26, 1924.  Serial No. 709,128.

The present invention relates to synthetic resins which are of a nature compatible with nitrocellulose, that is will blend with it in various useful proportions for example in equal proportions or even with a perfectly campatible resin the latter may be used in excess of the nitrocellulose without segregation and impairment of the properties of nitrocellulose which render it peculiarly valuable; and to processes of making resins.

Synthetic resins often can be obtained anhydrous as a result of the heat treatment required in manufacture without the necessity of special drying. They are free from dirt, gravel, straw and the like such as often is present in natural resins. Many synthetic resins can be produced in what may be termed for the purpose of this field of application unlimited amounts. Furthermore they may be specially made to meet various requirements including those having a low acid number. A further feature about synthetic resins is that those which appear to be highly compatible with nitrocellulose are in a general way soluble in the same solvents. This is of course a matter of great importance.

Typical for the purpose herein are the resinous combinations of glycerol and organic acids e. g. phthalic, tartaric, citric, succinic, lactic acids and in some cases their anhydrides. Mixtures of these or other appropriate acids and their anhydrides may be employed.

The tendency of such resinous products is to exhibit a high acid number. This acidity is due to free or uncombined acid. They also may be turbid through uncombined glycerol, both a high acid number and the presence of free glycerol is undesirable for many purposes and I prefer to employ with nitrocellulose resinous substances having an acid number below 50 or 60 and I have found a product having an acid number between 10 and 20 to be particularly desirable. Preferably also I aim to secure a product substantially devoid of free glycerol the latter being hygroscopic may affect the quality of the coating and cause turbidity therein. If various organic acids, phthalic acid for example is heated with glycerol in full combining proportions that is 2 mols. of glycerol to 3 mols of phthalic acid combination appears to take place in a way indicative of the union of 1 mol of phthalic acid or anhydride with 1 mol of glycerol if the acid number is any criterion thereon. One mol of phthalic acid esterifying completely with glycerol would form what may be termed a diglyceride. Or 2 mols of phthalic acid could combine with 1 mol of glycerol, the reaction in this case taking place to bring about reaction between one carboxyl group of each phthalic acid molecule and one hydroxyl group of the glycerol so that a carboxyl group of phthalic acid molecule would be free the other being united with glycerol to form an ester. It is possible that the reaction may progress in various ways and that mixtures of different glycerides are first formed and subsequently undergo transformation passing through a fusible and soluble form into an infusible form under the application of heat.

In making nitrocellulose coating solutions it is necessary to have a resin soluble in the solvents required for the nitrocellulose. Care must be taken therefore to avoid heating to the transformation point at which an insoluble resin results.

Many difficulties result in attempting to produce resins from glycerol and organic acids such as those mentioned when the object is to produce a resin of relatively low acid number substantially devoid of free glycerol and resistant to water. Many of these difficulties disappear if co-esterification is carried out with a natural resin, ordinary rosin being especially suitable for the purpose; thereby forming a complex in which rosin, glycerol and an organic acid are united and having properties differing from resins made separately from rosin and glycerol on the one hand and for example phthalic acid and glycerol on the other. In like manner other natural resins such as the copals, including Congo, manilla and the like, dammar etc. may be used. Rosin is however very desirable because of the ease with which the acid number may be reduced and free glycerol eliminated and because the resin obtained is relatively low in cost and has extremely useful properties.

Thus I may obtain a synthetic resin containing some natural resin in combination in such a manner that the properties of the natural resin are lost and a product highly useful in the nitrocellulose industry may be derived.

While I may produce such resinous combinations as Congo succinic glycerol resin, rosin Congo tartaric phthalic glycerol resin and the like I prefer to use phthalic acid as the principal or essential organic acid as distinct from the resin acids of natural resins. Phthalic anhydride is preferable to the acid. It may be made cheaply by the catalytic combustion-oxidation of naphthalene. It is therefore available in large quantities. Glycerol likewise is abundant. It is therefore preferable to glycols and other hydroxylated bodies of this general character. Ordinary rosin is cheap and easily obtainable.

By varying the proportions of rosin and phthalic anhydride the properties and solubility change somewhat. The larger the proportion the lower the acid number as a general rule.

In the nitrocellulose coating composition it will be seen therefore that I prefer to esterify a dibasic acid and a monobasic preferably resin acid with glycerol and react under heat to obtain a resinous substance but arrest the heat treatment before insoluble, infusible products result.

Resin made from phthalic anhydride and glycerol without any rosin is very white or light colored and may be prepared in a form soluble in ethyl alcohol containing 10 per cent of ethyl acetate. It is not as water resistant as the rosin phthalic glycerol resin but is preferable in making white enamels and white coatings generally for furniture and for inside use. It may be made for example as follows: Phthalic anhydride 740 parts, by weight, and glycerol 306 parts are heated and agitated while the temperature is brought to 233° C. Mechanical agitation is employed throughout the period of the reaction. This resin is not soluble in benzol but is soluble in acetone and in a mixture of 9 parts ethyl alcohol and 1 part ethyl acetate, also in mixtures of these solvents with benzol. The acid number is relatively high, in one case being 146. The resin is very pale, almost water white in color and is hard and tough. It is not very water resistant.

When the phthalic anhydride is reduced to give a proportion which theoretically would form glyceryl diphthalate the reaction mixture can be heated to about 260° C. before thickening and the formation of an infusible mass results. In one case a pale clear resin having an acid number of about 100 was obtained. This resin however appeared to consist of glyceryl triphthalate dispersed in free glycerol and is not recommended for making high grade nitrocellulose coatings.

A synthetic resin which I have found very useful is made by heating, with continuous mechanical agitation, a mixture of window-glass rosin 1340 parts by weight, phthalic anhydride 308 parts and glycerol 348 parts. The temperature is gradually raised to 290° C. This can be done in the course of an hour or two with small batches but with larger quantities a considerably longer period is required. Tests may be made from time to time to determine the acid number. When it has fallen to about 10 or to a figure between say 10 and 20 the resin may be cooled to 200° C. and allowed to cool. This resin is very soluble in benzol and in the usual nitrocellulose mixed solvents. It is notably compatible with nitrocellulose and the usual softening agents. While this resin is slightly brittle its hardness compares favorably with dammar resin. The color is fairly light and it is quite resistant to water.

The foregoing resin is made from proportions which would give the equivalent of 3 parts of rosin glyceride to 1 part of phthalic glyceride if these products were separately made but being reacted together a complex is obtained. In another case a resin was prepared which would give the equivalent of 1 part of rosin glyceride to 1 part of phthalic glyceride if these substances were separately prepared but which by co-reacting yield a complex as in the foregoing case. Prepared in the manner described above a resin of an acid number of 57 was obtained. On reducing the proportion of phthalic anhydride to an amount which theoretically would give the diphthalate a resin having the desirable acid number of 13 was obtained. It proved to be a complex in which the various ingredients entered into combination all together in some peculiar manner. The proportions employed were phthalic anhydride 309 parts by weight, rosin 435 parts, glycerol 255 parts. These ingredients were heated while the reaction mixture was continuously agitated and the temperature brought slowly to 290° C. The resin was slightly darker than the preceding but soluble in the same solvents and slightly harder than the resin described above made with the aid of a larger proportion of rosin.

In making resins of this character the reaction between glycerol and the acid components may be facilitated by using substances of a catalytic character.

Another resin made by reacting on tung oil with aniline or toluidine in the presence of zinc chloride is a different type of resin which may be employed in connection with the foregoing if desired or in some cases the nitrocellulose may be incorporated with this resin alone.

It may be noted that cumaron resin presumably because of its containing so large a proportions is not recommended for the bet- not nicely compatible with nitrocellulose and should be used sparingly as otherwise a very brittle product results. Ordinary rosin esters or so-called ester gums, which as is known are made principally from rosin and glycerol, may be added if desired but their use in large proportions is not recommended for the better grades of nitrocellulose coating compositions.

Many of these compositions require a softening agent to give increased flexibility and in some cases to improve the adhesion. A softening agent should be employed which is compatible with the nitrocellulose and synthetic resin and is soluble in the required solvents. Castor oil is a cheap softening agent. It is effective in anhydrous ethyl alcohol with or without benzol and low viscosity alcohol-soluble nitrocellulose and synthetic resins such as have been described above, especially the rosin phthalic glycerol resin. Diethyl phthalate also may be employed but is much more expensive. From 2½ to 10 per cent of the total weight of the mixture may be softening agent. Triacetin may be used in some cases but is more likely to cause cloudiness with such synthetic resins and makes the coating slightly less water resistant.

If paints or lacquer enamels are required dyes or pigments may be introduced, for example Prussian blue, titanox, lithopone, etc. It is best to very thoroughly grind the pigment in the finished mixture preferably in a ball mill for several hours. Grinding for 24 hours is desirable to secure good spreading qualities and avoid flocculation of the pigment. By grinding for several hours in this manner the pigment undergoes a peptization which may be attributed largely to the nitrocellulose and synthetic resin and in the peptized form when applied as a coating there does not appear any tendency during drying to flocculation or segregation of the pigment. A more uniform surface results.

The coating composition may be made by preparing a 50 per cent solution in benzol of rosin phthalic glycerol resin such as that first described above in which a relatively high proportion of rosin is used. A low viscosity alcohol-soluble cotton is dissolved in anhydrous ethyl alcohol or preferably a mixture of about 90 parts of dehydrated or anhydrous ethyl alcohol and 10 parts ethyl acetate with or without the addition of a fraction of a per cent of pyridine as an additional denaturant. The low viscosity cotton is preferably obtained from nitro cotton of high viscosity which has been heat treated or subjected to the action of alkali, preferably ammonia, to obtain the desired degree of reduction. These solutions are mixed in a proportion to give 2 parts by weight of nitro cotton to 3 parts of resin. Two and one-half per cent of castor oil may be added as a softening agent and if the composition is to be used as a lacquer enamel it is ground with say 5 to 20 per cent of a pigment of the desired shade until a substantially peptized or non-flocculating or non-coagulating composition results. The proportions of resins to nitrocotton may be varied from a major proportion of cotton on the one hand and a minor proportion of resin to the reverse condition as indicated in the foregoing examples.

If compositions are required free from hydrocarbons the solution may be made containing say 8 per cent of low viscosity alcohol-soluble nitro cotton, 10 or 12 per cent of phthalic glycerol resin, made without the addition of any natural resin, and a solvent consisting of anhydrous ethyl alcohol with or without the addition of 10 or 15 per cent of ethyl acetate or acetone and any suitable denaturants. Diethyl phthalate in the amount of 5 per cent may be added as a softening agent.

As noted above phthalic glyceride resin, without rosin or other natural resin in combination, is especially adapted for interior finishes, lacquers and enamels which have to be light colored, transparent or opaque white. It is well adapted for use with nitrocellulose which has been reduced in viscosity by heat treatment or by the action of chemical agents. If the phthalic glyceride contains too much uncombined phthalic acid or anhydride it may first be pulverized and washed to remove such excess. In some cases zinc oxide may be used as a neutralizing agent. Zinc phthalate could remain in the resin to serve as a portion of the pigment material when white enamels are to be produced.

Thus a composition may be made by dissolving equal parts of light colored phthalic glyceride resin and low viscosity nitrocellulose in a solvent mixture composed of ethyl alcohol 60 parts by weight, acetone 10 parts, ethyl acetate 10 parts and benzol 40 parts. If blushing occurs it is desirable to add a few per cent of butyl acetate. The total solids that is the mixture of phthalic glyceride and nitrocellulose may amount to from 15 to 25 per cent under ordinary conditions. Softeners and pigments may be added as desired. In this way a solution of low viscosity nitrocellulose and a type of synthetic resin particularly compatible with such low viscosity material is obtained which is adapted for use as a transparent substantially colorless lacquer and as a white enamel.

A somewhat different type of resin is that obtained by reacting on glycerol with phthalic anhydride and the fatty acids of hydrogenated castor oil. In some cases the free fatty acids of untreated castor oil may be used.

In the claims where the term rosin Congo phthalic glyceride resin is used, it is intended to cover a product resulting from the use of both rosin and Congo.

The term "low acid resin" or "resin of low acid number" as used herein may be defined in terms of the action of such resins in nitrocellulose compositions containing the same. Resins of high acid number result in deleterious effects in nitrocellulose coatings due to the action of the acid upon the nitrocellulose. Resins of low acid number therefore are more desirable in such compositions. Resin of low acid number may therefore be looked upon as a resin of such acid number that undesirable effects on the nitrocellulose due to such acidity are substantially eliminated.

What I claim is:—

1. A product adapted for incorporation with nitrocellulose comprising rosin phthalic glyceride resin of an acid number below 50.

2. A product adapted for incorporation with nitrocellulose comprising rosin phthalic glyceride resin of an acid number between approximately 10 and 20.

3. A product adapted for incorporation with nitrocellulose comprising rosin phthalic glyceride resin substantially free from glycerol and of sufficiently low acid number to blend readily with nitrocellulose without causing blushing or discoloration of a lacquer film produced with such nitrocellulose composition.

4. A product adapted for incorporation with nitrocellulose comprising the products of reaction of a natural resin of an acid character with glycerol and a dibasic organic acid forming a resin of acid number below 50 and substantially devoid of free glycerol.

5. Rosin Congo phthalic glyceride resin substantially devoid of free glycerol and of sufficiently low acid number to blend readily with nitrocellulose without causing blushing or discoloration of a lacquer film produced with such nitrocellulose composition.

6. A product adapted for incorporation with nitrocellulose in coating compositions comprising a soluble, fusible glyceride resin substantially devoid of free glycerol and of sufficiently low acid number to blend readily with nitrocellulose without causing blushing or discoloration of a lacquer film produced with such nitrocellulose composition.

7. A resinous product comprising a soluble, fusible alkyd resin, of acid number below 60.

8. A product adapted for incorporation with nitrocellulose comprising the products of reaction of a natural resin with a polyhydric alcohol and a dibasic organic acid, forming a resin of acid number below 50.

9. The process of producing a reaction product adapted for incorporation with nitrocellulose which comprises heating a natural resin, a polyhydric alcohol, and a polybasic organic acid, until a resin of sufficiently low acid number is produced which resin blends readily with nitrocellulose without causing blushing or discoloration of a lacquer film produced with such nitrocellulose composition.

10. The process of making fusible soluble low acid resins soluble to the extent of at least 50% in solvents of the benzol type of hydrocarbons, said resins containing at least three interreacting agents of resinification which comprises heating together to a reaction temperature a mixture containing a polyhydric alcohol, a polybasic organic carboxylic acid, and a fixed monobasic organic carboxylic non-resin acid, and continuing the heating until the acid number falls below 60.

11. The process of making a complex rosin ester which comprises heating rosin, glycerol and phthalic acid together in such proportions as to give a resin of sufficiently low acid number to blend readily with nitrocellulose without causing blushing or discoloration of a lacquer film produced with such nitrocellulose composition, such heating being to a temperature at which water is evolved and a resinous substance obtained.

12. The method of making a complex resin ester which comprises heating a natural resin containing free resin acid with glycerol and phthalic acid in such proportions as to give a resin of sufficiently low acid number to blend readily with nitrocellulose without causing blushing or discoloration of a lacquer film produced with such nitrocellulose composition, such heating being sufficient to form a resinous complex.

13. The process of making a complex resin ester which comprises heating together a natural resin containing free resin acid, a polyhydric alcohol and a dibasic organic carboxylic acid material, in such proportions as to give a resin of sufficiently low acid number to blend readily with nitrocellulose without causing blushing or discoloration of a lacquer film produced with such nitrocellulose composition, such heating being to a temperature at which water is evolved and a resinous substance obtained.

14. The process of making an artificial resin of low acid number which comprises heating an acid-containing natural resin with a polyhydric alcohol and an organic carboxylic acid, the reacting substances being heated together and the temperature being carried to a point at which a homogeneous resinous product is obtained, such substances being in such proportions as to give a resin of sufficiently low acid number to blend readily with nitrocellulose without causing blushing or discoloration of a lacquer film produced with such nitrocellulose composition.

15. A process which comprises heating a mixture comprising a natural acid resin, phthalic acid material and glycerol, to about 290° C., such substances being in such proportion as to give at the temperature stated, a resinous product of sufficiently low acid number to blend readily with nitrocellulose without causing blushing or discoloration of a lacquer film produced with such nitrocellulose compositions.

16. A process which comprises heating a mixture comprising rosin, phthalic acid material and glycerol, to about 290° C., such substances being in such proportions as to give, at the temperature stated, a resinous product of sufficiently low acid number to blend readily with nitrocellulose without causing blushing or discoloration of a lacquer film produced with such nitrocellulose compositions.

17. As a new product, a resinous condensation product obtained by acting on glycerine with a mixture of phthalic anhydride and a natural resin the amount of natural resin being less than the sum of the amounts of phthalic anhydride and glycerine.

18. The process of making fusible soluble low acid resins containing at least three interreacting agents of resinification which comprises heating together to a reaction temperature a mixture comprising a polyhydric alcohol, a polybasic organic carboxylic acid, and a monobasic carboxylic acid and continuing the heating until the acid number falls below 60.

19. A product soluble in various mixed organic solvents comprising the resinified glycerides of a polybasic organic carboxylic acid and a monobasic organic carboxylic acid, the product having an acid number below 60.

20. A resinous product soluble to the extent of at least a 50% solution in solvents of the benzol type of hydrocarbons, comprising resinified glycerol, polybasic organic carboxylic acid and fixed nonobasic organic carboxylic non-resin acid, the product having an acid number below 60, and said product being substantially devoid of free glycerol in an amount sufficient to render a coating produced therewith turbid and hygroscopic.

21. A product soluble to the extent of at least a 50% solution in solvents of the benzol type of hydrocarbons, said product comprising resinified glycerol, polybasic organic carboxylic acid and monobasic organic carboxylic acid, the product having an acid number below 60.

22. A fusible glyceride resin soluble to the extent of at least a 50% solution in solvents of the benzol type of hydrocarbons comprising resinified glycerol, phthalic anhydride and monobasic organic carboxylic non-resin acid, said resin being substantially devoid of free glycerol in an amount sufficient to render a coating produced therewith turbid and hygroscopic, and said resin being of sufficiently low acid number blending readily with nitrocellulose without causing blushing or discoloration of a lacquer film produced with such nitrocellulose composition, and capable of being used therein in excess of the nitrocellulose without segregation and impairment of the properties of nitrocellulose which render it peculiarly valuable.

CARLETON ELLIS.